UNITED STATES PATENT OFFICE.

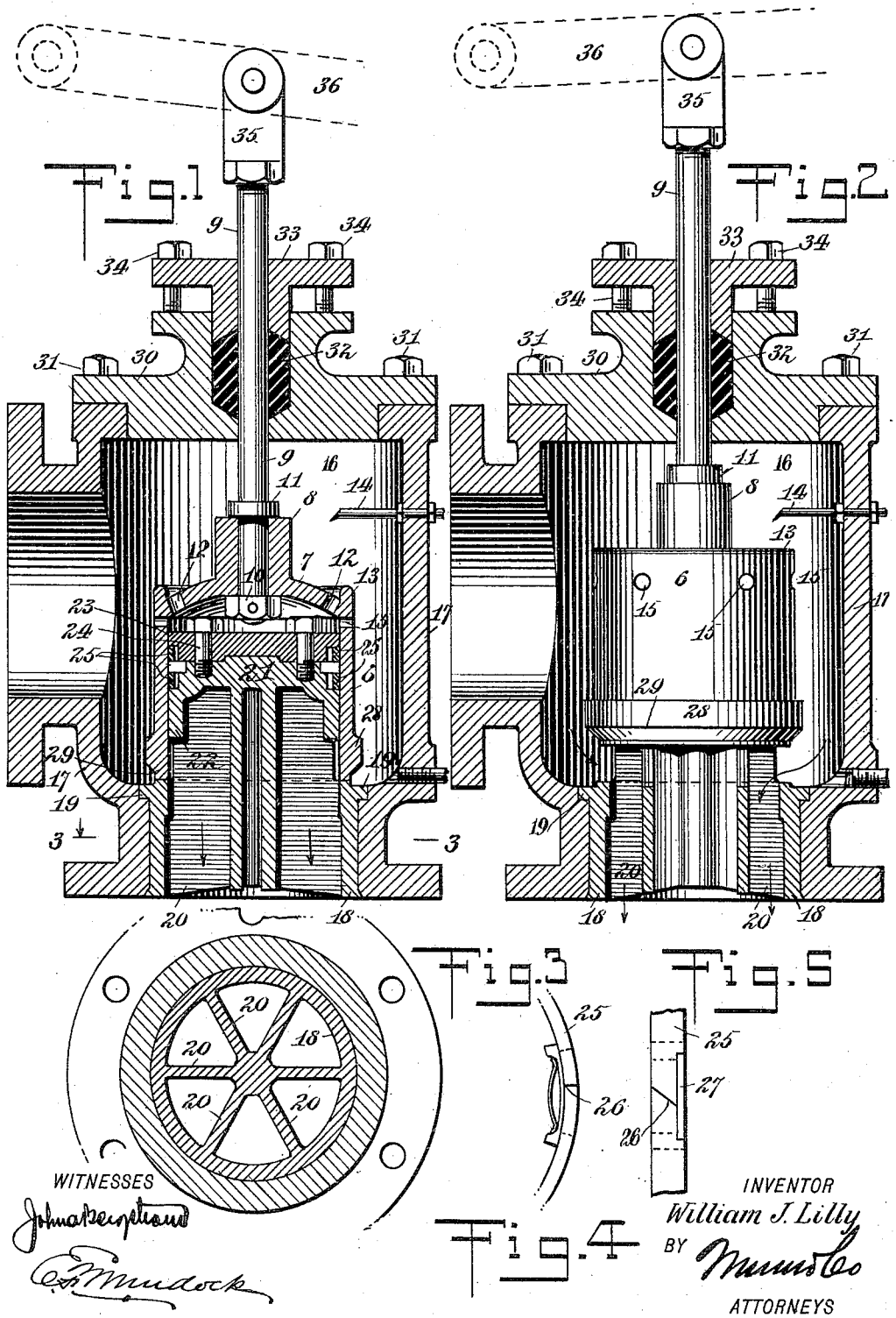

WILLIAM JAMES LILLY, OF BUTTE, MONTANA.

THROTTLE-VALVE.

986,184. Specification of Letters Patent. Patented Mar. 7, 1911.

Application filed July 6, 1910. Serial No. 570,556.

*To all whom it may concern:*

Be it known that I, WILLIAM J. LILLY, a subject of the King of England, and a resident of Butte, in the county of Silverbow and State of Montana, have invented a new and Improved Throttle-Valve, of which the following is a full, clear, and exact description.

Among the principal objects which the present invention has in view are: to provide a valve of the character described, adapted for use in high or low pressure, wherein the seating pressure is balanced; to provide a construction wherein the wear of the operative member is minimized; to provide new and efficient means for preventing the leakage of steam past the cut-off members; to provide means for retracting the operating parts of the valve structure; and to provide a compact, direct-acting and self-housed valve structure.

One embodiment of the present invention is disclosed in the structure illustrated in the accompanying drawings, in which like characters of reference denote corresponding parts in all the views, and in which—

Figure 1 is a vertical section of a throttle valve constructed in accordance with the present invention and as mounted in a valve casing; Fig. 2 is a side elevation of the movable member of the valve, the same being raised from the valve seat, the valve casing and the valve guide member being shown in section; Fig. 3 is a cross section of the valve casing and valve guide, the section being taken on the line 3—3 in Fig. 1; Fig. 4 is a detail view in plan of the junction ends of a packing ring; and Fig. 5 is a side view of the packing ring at the junction ends thereof.

In the present invention the movable valve member is an inverted cup-shaped cylinder 6. The head 7 of the cylinder 6 is slightly domed, as shown particularly in Fig. 1 of the drawings. Extended from the dome 7 is a boss 8, which is perforated to receive a pitman rod 9. The pitman 9 is held in position by a suitable nut 10 which is secured rigidly in position by a pin driven through the said nut and pitman after the nut is set up. The pull of the nut 10 is against a collar 11 rigidly formed on the pitman 9. The dome 7 is provided with perforations 12, 12 extended from the said dome at the lowest point of the junction between the said dome and an upturned flange 13. The perforations 12 serve as tubes to carry lubricant received through a pipe 14 from outside the casing and delivered upon the top of the dome 7, where it is guided by the flange 13 to the perforations 12, 12. Immediately below the junction line of the dome 7 and the cylinder 6 are provided annular series of perforations 15, 15. When the cylinder 6 is in its lowered position the perforations 15, 15 form communication for the space under the dome 7 and the steam chamber 16 within the steam casing 17.

The valve seat is formed at the upper edge of an inserted tube 18. The tube 18 is provided with an annular flange 19. Formed integrally with the tube 18 are vertically disposed webs 20, 20. The webs 20, 20 are joined and form at the upper end, a head 21 from which is depended an annular flange 22 which serves as a guide for the cylinder 6. To the head 21 is rigidly secured a plate 23, being held in position by bolts 24, 24. Both the upper edge of the head 21 and the lower edge of the plate 23 are grooved to receive a packing ring 25. The packing ring 25 is of the usual spring metal type, being, in the present instance, split to form an inclined junction as at 26, the one end of said ring being provided with a bridge plate 27 to prevent the admission of steam below the said packing ring when the same is expanded.

The lower edge of the cylinder 6 is formed with an annular projection 28, the under surface of which is undercut to form an elongated lifting surface 29. The surface 29 is formed by extending the cylindrical surface of the cylinder 6 above the projection 28 and contacting the cylindrical surface below the said projection. This permits the pressure of the steam to exert a slight lifting strain upon the movable valve member.

Below the projection 28 is a short downward extension of the cylinder 6 upon which is ground the valve seat to rest upon a slightly upturned edge of the tube 18, which is likewise ground as a valve seat.

The casing 17 is closed by the usual cap 30, which is bolted to the casing by bolts 31, 31. The pitman 9 is passed upward through the cap 30, a perforation being provided centrally located therein and closed by a packing 32, for which a housing is provided closed by a gland 33, which is held in position by studs 34, 34. At the upper end of the pitman 9 is secured the usual connecting clip 35 for engagement with a throttle lever 36.

Having a construction thus described, and as shown in the accompanying drawings, the operation is as follows: When the valve is closed, as shown in Fig. 1 of the drawings, and steam is admitted to the steam chamber 16, the steam enters through the perforations 15, 15 under the dome 7, and extends about the cylinder 6 and below the inclined surface 29 at the lower end thereof. It will be seen that the pressure exerted under the dome 7 equalizes the pressure exerted on the top thereof. A slight excess of downward pressure on the dome is caused by the extension of the flange 13 beyond the inner surface of the said dome. It is to compensate for this slight excess that the cylinder 6 is undercut to produce the upward lifting surface 29. The extent of the surface 29 is calculated to partly compensate for the difference in the under and upper area of the dome 7. When this construction is thus produced it will be seen that the downward and upward pressures of the steam upon the movable valve member are balanced as desired. This condition is preferably that wherein the valve is seated with a small overbalance of pressure. It may, however, be regulated so that the slightest strain upon the lever 36 operates to move the movable valve member and cylinder 6 to any degree, no matter how fine. With such a construction there is obviated the tendency to jerk the throttle valve from full shut to full open position, due to the excess force required to lift the valve from its seat when the pressure of the steam is not thus counter-balanced. The passage of the steam from the chamber 16 under the dome 7 downward is prevented by the packing rings 25, and the entrance from the steam chamber to the cylinder is absolutely prevented, except as the movable valve member, the cylinder 6, is raised from its seat on the top of the tube 18.

The lubricating pipe 14, which is introduced through the side of the chamber 16, is carried to any suitable form of force pump, by means of which lubricant is injected. As above indicated, when the lubricant is introduced through the pipe 14, it falls from the mouth thereof on to the dome 7 and runs to the flange 13, where it is held until drained by the ducts 12, 12 and delivered upon the top plate 23 of the stationary member of the valve. Here it is out-spread and conveyed to the packing rings 25 and the interior of the surface of the cylinder 6.

Having thus described my invention, what I claim as new and desire to secure by Letters Patent is:—

1. A throttle valve comprising a stationary guide standard extended within the steam chamber, having a cylindrical head extended within said chamber and a cylindrical member forming a valve seat and integrally connected with the said head by suitable webs; a cylindrical member surrounding said head and forming a closure with the valve seat; a dome for said cylindrical member; suitable openings under said dome communicating with the steam chamber; a packing extended between the head of said standard and inner surface of said cylindrical member; an annular projection formed on said cylindrical member, having a lower surface in excess of its upper surface to compensate for the thickness of the wall of said cylindrical member; and means for raising and lowering the said cylindrical member from and to the seat of said valve.

2. A throttle valve comprising a stationary guide standard extended within the steam chamber; a cylindrical movable valve member guidably mounted upon said standard and provided with a perforated top portion having an annular upturned rim; and a lubricating pipe extending through the wall of the steam casing above the said top portion of said movable member.

In testimony whereof I have signed my name to this specification in the presence of two subscribing witnesses.

WILLIAM JAMES LILLY.

Witnesses:
W. F. WADDELL,
NEIL G. McLEOD.

---

Copies of this patent may be obtained for five cents each, by addressing the "Commissioner of Patents, Washington, D. C."